United States Patent Office 3,466,078
Patented Sept. 9, 1969

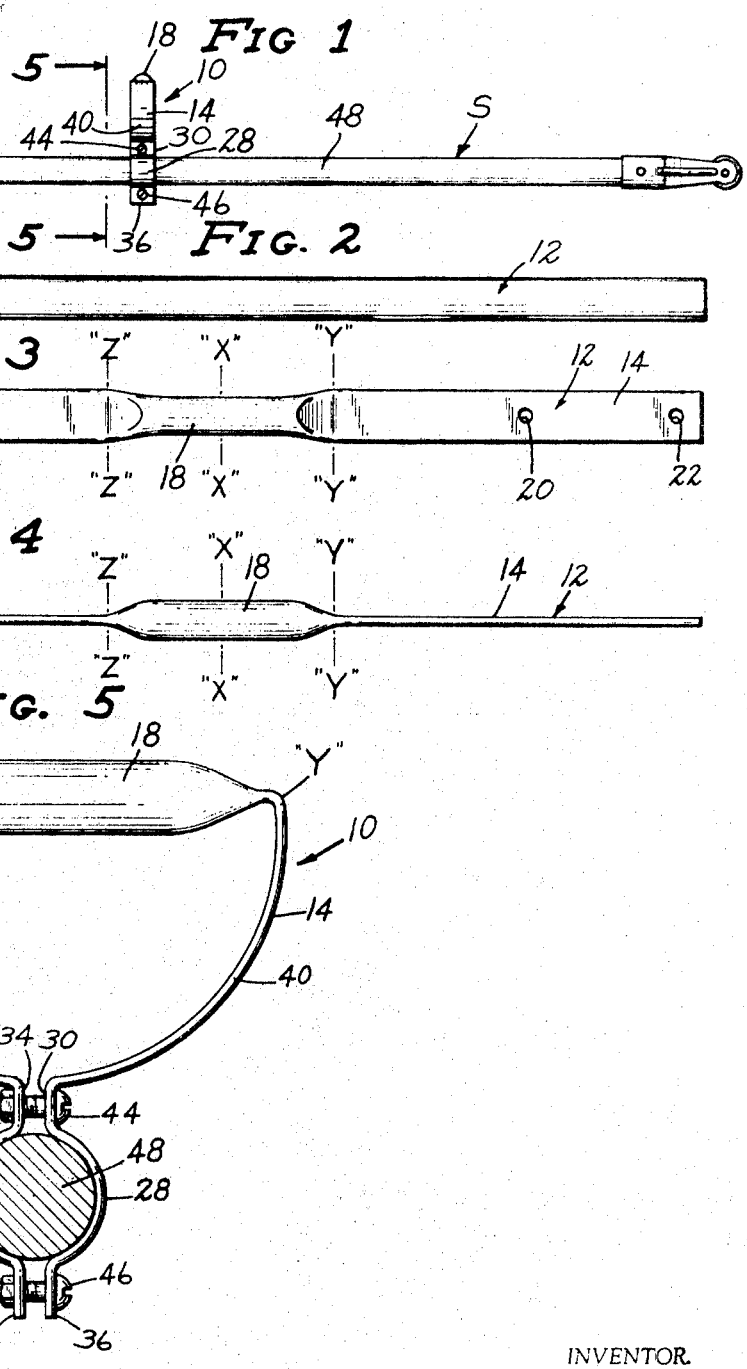

3,466,078
AUXILIARY HANDLE FOR A SHOVEL
Richard J. Sholund, 12 1st Ave.,
Duluth, Minn. 55810
Filed May 10, 1967, Ser. No. 637,508
Int. Cl. B25g 3/24; A01b 1/22
U.S. Cl. 294—57                    1 Claim

ABSTRACT OF THE DISCLOSURE

The invention is an auxiliary handle for a shovel used in conjunction with the conventional handle grip on the outer free end of a conventional shovel and includes a tubular grip portion from each end of which extends an integral flat side member. Each of said side members is formed with an integral flat half clamp formation, the half clamp formations having draw-up nut-equipped bolt members for connection with the handle of a shovel to place the grip portion in a position normal to the longitudinal axis of the grip portion, the side members and the half clamp formations all formed from one piece of elongated tubular material.

Summary of the invention

The invention is an auxiliary handle for shovels and is mounted on the handle of a conventional shovel and used in conjunction with the handle grip on the outer end of the handle. Known auxiliary handles are constructed of a separate grip portion, separate flat side or yoke portions connected to the grip portion by separate additional means together with additional separate clamp means for fastening the handle to the handle shaft of a shovel. Through extended use the separate parts may become loose and disconnected.

In the present invention the auxiliary handle includes a tubular grip portion from which extends flat side members, each of said side members terminating in a half clamp portion, the half clamp portions having draw-up nut-equipped bolt members for securing the handle to the handle shaft of a shovel, all of the portions of the handle being formed from one piece of elongated tubular material.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example of preferred embodiment of the inventive idea wherein like numerals refer to like parts throughout.

In the drawings forming part of this application:

FIGURE 1 is a side elevation of a conventional shovel showing the improved auxiliary handle mounted thereon in operative position.

FIGURE 2 is a side elevational view of an elongated piece of tubing from which the entire auxiliary handle is formed exclusive of the tightening means.

FIGURE 3 is a top plan view of the auxiliary handle formed from the one piece of tubing in flat extended condition.

FIGURE 4 is a side elevation of that shown in FIGURE 3.

FIGURE 5 is a view on the line 5—5 of FIGURE 1.

Referring to the drawings in detail, the auxiliary handle 10 is formed of a single piece of tubular material 12, exclusive of the fastening means. The longitudinal centerline is noted as at $x$ on the piece 12. The tubular piece 12 is then flattened from one end inwardly to point $y$ forming flat side leg portion 14 and from the other end inwardly an equal distance to form flat side leg portion 16 to point $z$. Such formations leave the centrally disposed tubular hand gripable portion 18, the distance between $x$ and $y$ being the same as the distance between $x$ and $z$. The side leg portion 14 is then formed with the first inner bolt hole 20 spaced outwardly from point $y$ and the first outer bolt hole 22 spaced from hole 20 and the outer free end of the side leg portion. The side leg portion 16 is formed with the second inner bolt hole 24 spaced outwardly from point $z$ and the second outer bolt hole 26 spaced from hole 24 and the outer free end of the side leg portion.

The portion of side leg 14 substantially between the bolt hole 20 and the bolt hole 22 is formed with the first arcuate jaw portion 28 together with the flat portion 30 at hole 20.

The portion of side leg 16 substantially between the bolt hole 24 and the bolt hole 26 is formed with the second arcuate jaw portion 32 together with the flat portion 34 at hole 24. The outer free end of leg 14 is formed with the first flat end portion 36 at bolt hole 22, and the outer free end of leg 14 is formed with the second flat end portion 38 at bolt hole 26.

The portion of side leg 14 between flat portion 30 and and point $y$ is arcuately formed as at 40, and the side leg 16 between flat portion 34 and point $z$ is arcuately formed as at 42. The arcuate portions 40 and 42 of legs 14 and 16, respectively, form substantially a yoke connected by the tubular hand grip portion 18 and depending therefrom are the jaw portions 28 and 32.

Further provided is the upper nut-equipped bolt 44 positioned in hole 20 and hole 24 and lower nut-equipped bolt 46 positioned in hole 22 and hole 26 thereby forming a complete clamp for mounting the handle 10 on the shovel handle 48 of the shovel S. Thus, with a single piece of tubular material 12 a complete handle having a tubular grip portion and flat side portions is provided, the flat side portions providing a flat clamp bearing surface upon the shovel handle 48. The only other parts necessary to complete the handle are the two nut-equipped bolts 44 and 46. The handle 10 is virtually indestructable and extremely easy of formation thereby allowing the handle to be made very economically.

The invention is not to be understood as restricted to the details set forth since these may be modified within the scope of the invention.

Having thus described the invention, what is claimed as new and desired to be secured by Letters Patent is:

1. An auxiliary handle for detachable securement to the intermediate portion of a handle of a shovel comprising:

(a) a single one piece elongated tubular member forming the entire handle and having a tubular grip portion centrally thereof, (b) said elongated member having a depending flattened arcuate leg portion extending inwardly from each end of said tubular grip portion,
(c) said elongated member also having a complementary flattened half clamping arcuate jaw means formed on each of said leg portions for engagement with a shovel handle, and
(d) means for holding said flattened half clamping means of each leg portion in clamping engagement with a shovel handle.

References Cited

UNITED STATES PATENTS 237,891 2/1881 Musselman _____ 294—58
2,595,695 5/1952 Packer et al. _____ 113—116

BOBBY R. GAY, Primary Examiner

D. L. TROUTMAN, Assistant Examiner

U.S. Cl. X.R.

16—110; 294—58